US008056469B2

United States Patent
Sala et al.

(10) Patent No.: US 8,056,469 B2
(45) Date of Patent: Nov. 15, 2011

(54) COFFEE MACHINE WITH DISPENSER OF A READY PREPARED CHOCOLATE-BASED BEVERAGE

(75) Inventors: Dario Sala, Binasco MI (IT); Andrea Coccia, Binasco MI (IT)

(73) Assignee: Gruppo Cimbali S.p.A. (IT)

( * ) Notice: Subject to any disclaimer, the term of this patent is extended or adjusted under 35 U.S.C. 154(b) by 561 days.

(21) Appl. No.: 12/240,050

(22) Filed: Sep. 29, 2008

(65) Prior Publication Data
US 2009/0095163 A1    Apr. 16, 2009

(30) Foreign Application Priority Data
Oct. 16, 2007    (EP) .................................... 07425650

(51) Int. Cl.
*A47J 31/00*    (2006.01)
(52) U.S. Cl. .............................. 99/290; 99/293; 99/323.1
(58) Field of Classification Search ..................... 99/290, 99/293, 323.1, 348; 222/148, 129.3, 129.4, 222/146.1, 146.2
See application file for complete search history.

(56) References Cited

U.S. PATENT DOCUMENTS

| | | | | |
|---|---|---|---|---|
| 5,207,148 A * | 5/1993 | Anderson et al. | ................. | 99/281 |
| 6,889,600 B2 * | 5/2005 | Rava | ............................. | 99/323.3 |
| 7,507,430 B2 * | 3/2009 | Stearns et al. | ................. | 426/474 |
| 2005/0115597 A1 * | 6/2005 | Carhuff et al. | ................. | 134/134 |
| 2009/0293733 A1 * | 12/2009 | Martin et al. | ................... | 99/280 |

FOREIGN PATENT DOCUMENTS

| EP | 1 374 748 | 1/2004 |
|---|---|---|
| NL | 1 029 155 | 4/2006 |
| WO | WO 2006/135864 | 12/2006 |

* cited by examiner

*Primary Examiner* — Reginald L Alexander
(74) *Attorney, Agent, or Firm* — Jonathan D. Ball; King & Spalding LLP

(57) ABSTRACT

Coffee machine, comprising at least one steam generator for producing steam and an apparatus for producing the coffee with associated dispensing device, a storage tank containing a ready prepared liquid chocolate product with a density suitable for being a conventional chocolate beverage, a heating device provided with an inlet and an outlet for the product to be heated and an inlet for introducing the steam, a line between said storage tank and the inlet of said heating device, a metering pump arranged along said line for conveying a predetermined amount of chocolate-based product from said storage tank to said heating device and for circulating it inside it, a line for the steam, connecting said steam generator to said inlet for the steam of the heating device, an intercept valve arranged along the said steam line as well as a beverage dispensing device connected to the outlet of the said heating device.
The machine allows the dispensing of various types of beverages, such as chocolate, coffee, milk and cappuccino and owing to the presence of said intercept valve, said metering pump may dispense the chocolate beverage in hot condition or in cold condition.

Figure 1:
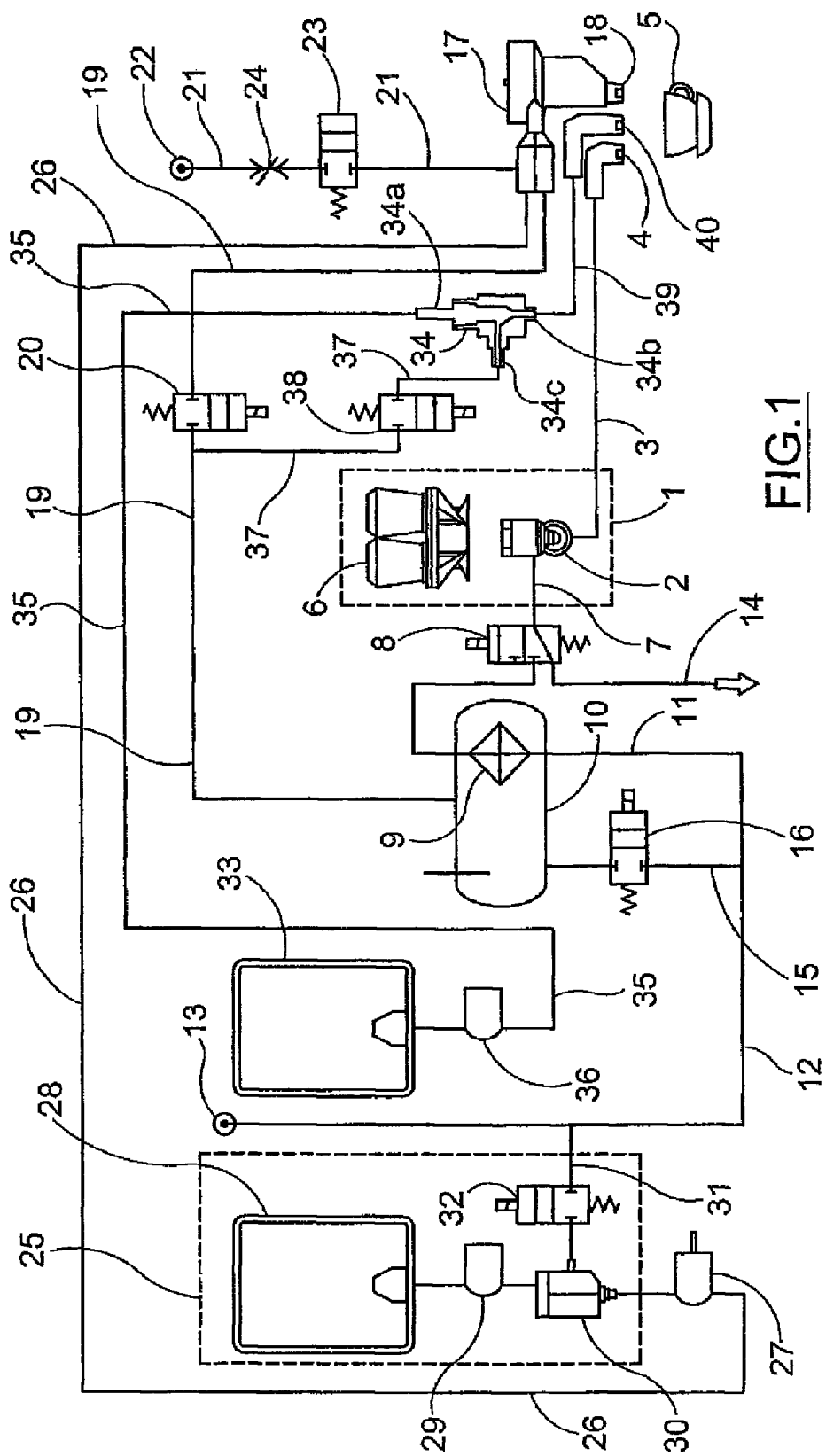

4 Claims, 1 Drawing Sheet ed type.

COFFEE MACHINE WITH DISPENSER OF A READY PREPARED CHOCOLATE-BASED BEVERAGE

BACKGROUND OF THE INVENTION

The present invention relates to a coffee machine comprising at least one steam generator and suitable for dispensing a chocolate-based beverage.

Coffee machines suitable for preparing and dispensing various types of beverages are known in the specific technological sector.

An example of such machines is disclosed in WO-A-2006/135,864

In accordance with the known art these machines comprise an apparatus for producing coffee with an associated coffee dispensing device, a first water heater for producing steam, a second water heater for producing hot water for preparing the coffee in said apparatus, said first and second heaters being connected to a water source for replenishing them with water, a frothing device provided with an inner chamber for frothing the milk when required and at least one spout for dispensing the milk externally, said machine also comprising a milk line, connecting a source of liquid milk to the frothing device, a steam line, connecting said water heater for producing steam to the frothing device, as well as an air line, connecting an air source to the said frothing device, and respective intercept valves arranged along the said steam and air lines, said pump and said intercept valves arranged respectively along the air line and the steam line being able to be operated independently of each other such that the milk line, the steam line and the air line are connected to said chamber of the frothing device one at a time or in combination with each other.

Apparatus of the type mentioned above are known both in the sector of automatic beverage dispensing machines and in the sector of automatic machines used professionally in bars.

The various types of beverages which may be dispensed, as is known, comprise mainly cappuccino where an amount of—usually hot—foamed or frothed milk is added to the coffee, but also coffee with the addition of a small amount of hot or cold milk which is not frothed.

In the machines of the type mentioned above it was found that there also existed the need for other types of beverages, including mainly chocolate-based beverages.

EP-A-1,374,748 discloses an example of an apparatus for dispensing hot diary beverages which may include hot chocolate milk. However the disclosure of such a document does not contain any hint of making it possible the delivery of the beverages in the cold conditions.

SUMMARY OF THE INVENTION

The object of the present invention is to provide the possibility of obtaining from a coffee machine, in particular but not exclusively of the type mentioned above, also both hot and cold chocolate-based beverages in order to satisfy the needs of users as regards variation of coffee and milk based beverages.

This object is achieved by a coffee machine which comprises at least one steam generator for producing steam, an apparatus for producing the coffee with associated dispensing device, a storage tank containing a ready prepared, liquid, chocolate product having a density suitable for being a conventional chocolate beverage, a heating device provided with an inlet and an outlet for the product to be heated and an inlet for introducing the steam, a line between said storage tank and the inlet of said heating device, a metering pump arranged along said line for conveying a predetermined amount of chocolate-based product from said storage tank to said heating device and for circulating said amount inside it, a line for the steam, connecting said generator to said inlet for the steam of the heating device, an intercept valve arranged along the said steam line as well as a beverage dispensing device connected to the outlet of the said heating device, wherein, owing to the presence of said intercept valve, said metering pump may dispense the chocolate beverage in hot condition or in cold condition.

DETAILED DESCRIPTION OF A PREFERRED EMBODIMENT

The characteristic features and advantages of the present invention will emerge more clearly from the following detailed description of a preferred embodiment thereof, illustrated by way of a non-limiting example in the accompanying drawings in which:

FIG. 1 shows, in schematic form, the circuit layout of the apparatus.

With reference to abovementioned FIG. 1, 1 denotes in its entirety an apparatus for producing coffee, in particular espresso coffee, without this necessarily excluding a different type of coffee beverage. 2 denotes the coffee extraction device which is connected, by means of a line 3, to a conventional dispensing device 4 below which a receiving cup, schematically denoted by 5, is situated.

The characteristics of the coffee extraction device 2 depend on the preparation methods: it may be in the form of a simple mixer in the case of coffee which is soluble or in the form of concentrated syrup.

Alternatively, it may consist of a conventional device with filter.

Numeral 6 denotes schematically a conventional container for dispensing the soluble coffee or the concentrated coffee syrup or also represents the device for grinding the coffee beans in the case of traditional espresso coffee.

The extraction device 2 is connected by means of the line 7 to an intercept valve 8 which connects it to the hot water source which, in the case of FIG. 1, consists of a heat exchanger 9 which is situated inside a steam generator 10 and, in the machine, is also intended to produce steam. The heat exchanger 9 is connected, by means of the line 11 and the line 12, to a water source 13 for the necessary replenishing with water.

In the position where it intercepts the line 7, the valve 8 connects the extraction device to an outlet denoted by 14 for removal of any residual matter.

The steam generator 10 is also replenished with water from the source 13 via the line 15 and the intercept valve 16.

A milk frothing device, denoted overall by 17, with an associated dispensing spout 18 situated above the cup 5, is associated with the apparatus 1 for producing coffee. The frothing device 17 is connected, by means of the line 19 and the intercept valve 20, to the steam generator 10. By means of another line, denoted by 21, the frothing device 17 is connected to an air source, denoted by 22. An intercept valve 23 and, where necessary, an adjustable throttling device 24 are arranged along the line 21.

Finally, the same frothing device 17 again is connected to a source 25 of liquid milk by means of a line 26 along which a pump 27, operated by a conventional electric motor (not shown), is arranged. The pump 27 may be advantageously of the peristaltic type or gear type and the electric motor may be of the variable-speed type.

The source 25 of liquid milk consists of a storage tank 28 for concentrated milk in the fluid state which is conveyed, by means of a metering pump 29, to a connector 30 which may also be designed to contain internally a non-return valve (not shown in the drawings) suitable for preventing bacterial contamination of the product contained in the storage tank 28.

The water source 13 is connected to the connector 30 by means of a line 31 intercepted by the valve 32.

Mixing of a predetermined quantity of concentrated milk and water from the source 13 is performed inside the connector 30, resulting in the formation of cold diluted milk.

The latter, by means of the pump 27 and the line 26, is propelled as far as the frothing device 17 where heating is performed by means of transfer of the condensation heat of the steam from the boiler 10 via the line 19 and the intercept valve 20.

Any frothing of the milk is performed by means of the introduction of air along the line 21 and the adjustable throttling device 24.

In the case where a quantity of cold milk is desired or requested by the user, the steam valve 20 is kept closed. In these conditions the cold milk may be dispensed in its liquid state or may also be frothed, by supplying air to the device 17 via the line 21.

In accordance with the invention the coffee machine comprises a storage tank 33 containing a chocolate product in the liquid state already prepared with the conventional density of a chocolate drink ready for consumption.

The storage tank 33, which may consist, for example, of a conventional liquid drinks carton, is connected to the inlet 34a of a steam heating device denoted overall by 34, by means of the line 35 and a metering pump 36.

The steam heating device 34, which may be of the conventional type, comprises an inlet 34a for the product to be heated, an outlet 34b for the heated product and an inlet 34c for the heating steam.

The inlet 34c is connected to the steam line 19 leading from the boiler 10, by means of a line 37 and associated intercept valve 38.

A line 39 leaving the heating device 34 connects the outlet 34b of the latter to a dispensing device 40.

As can be seen in FIG. 1, the dispensing device 40 for the chocolate-based beverage is situated preferably close to the respective coffee and milk dispensing devices 4 and 18 so that, with a single position of the cup 5, it is possible to collect in the cup the various types of beverages which the machine is able to dispense.

Owing to the presence of the valve 38 along the line which conveys the steam to the heating device 34, it is possible to dispense the chocolate drink supplied by the metering pump 36 both in the hot condition and in the cold condition.

From the above it can be understood that, depending on the opening state of the intercept valves 8, 20, 23 and 38 as well as operation of the milk pump 27 and the pump 36 for metering the chocolate-based product, various types of beverages, both hot and cold, may be dispensed, including, therefore, in addition to the usual coffee, cappuccino and milk, also chocolate, all of which in the same machine and using procedures which can be implemented automatically with the maximum flexibility as regards the type of beverage to be dispensed and at the same time ensuring a high degree of operational reliability.

What we claim is:

1. A coffee machine which comprises at least one steam generator for producing steam, an apparatus for producing the coffee with associated dispensing device, a storage tank containing a ready prepared, liquid, chocolate-based product having a density suitable for being a conventional chocolate beverage, a heating device provided with a chocolate-based product inlet and an outlet for the product to be heated and a steam inlet for introducing the steam, a chocolate-based product line between said storage tank and the chocolate-based product inlet of said heating device, a metering pump arranged along said chocolate-based product line for conveying a predetermined amount of chocolate-based product from said storage tank to said heating device and for circulating said amount inside it, a steam line for the steam, connecting said steam generator to said steam inlet for the steam of the heating device, a first steam intercept valve having an open state and a closed state arranged along the said steam line as well as a beverage dispensing device connected through a dispensing line to the outlet of the said heating device, wherein, owing to the presence of said first steam intercept valve, said metering pump may dispense the chocolate beverage in hot condition when said first steam intercept valve is in said open state or in cold condition when said first steam intercept valve is in said closed state.

2. Coffee machine according to claim 1, which further comprises a source of liquid milk, an air source, a frothing device for frothing the milk when required, at least one spout on the frothing device for dispensing the milk externally from said frothing device, a milk line connecting said source of liquid milk to the frothing device, a steam line connecting said steam generator to the frothing device as well as an air line for the air, connecting said air source to the said frothing device, a milk pump arranged along the said milk line for supplying the milk from said milk source to said frothing device, and a second steam intercept valve arranged along said steam line connecting the steam generator to the frothing device and an air intercept valve arranged along the air line, said milk pump arranged along the milk line and said air and second steam intercept valves respectively arranged along the air line and the steam line connecting the steam generator to the frothing device being able to be operated independently of each other.

3. Coffee machine according to claims 1 and 2, wherein said beverage dispensing device for the chocolate-based beverage is positioned close to the coffee and milk dispensing devices so that, with a single position of a collecting cup, it is possible to collect in a cup the various types of beverages which the machine is able to dispense.

4. Coffee machine according to claim 2, wherein said source of liquid milk comprises a storage tank for concentrated milk, a dilution connector, a milk metering pump for supplying a predetermined quantity of concentrated milk to said dilution connector, a water line between said dilution connector and a cold water source, and a valve arranged along said water line for supplying a predetermined quantity of cold water to the said dilution connector in proportion to the quantity of concentrated milk present in the dilution connector.

* * * * *